Figure 1:
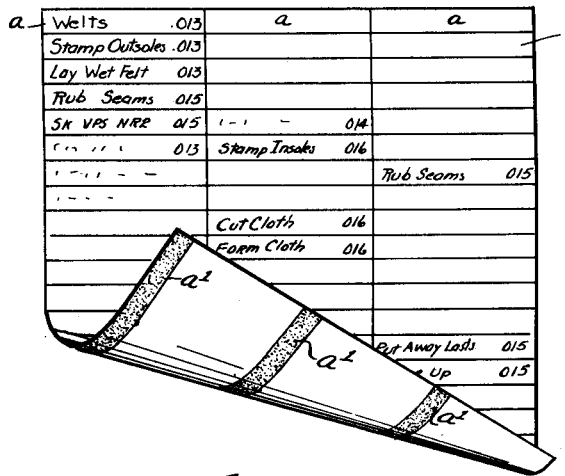

Nov. 6, 1934.  H. C. OSBORN  1,979,283
ACCOUNTING SYSTEM
Filed Nov. 18, 1932   2 Sheets-Sheet 1

Inventor
Henry C. Osborn,
By Watro Solnick Hean,
Attorneys

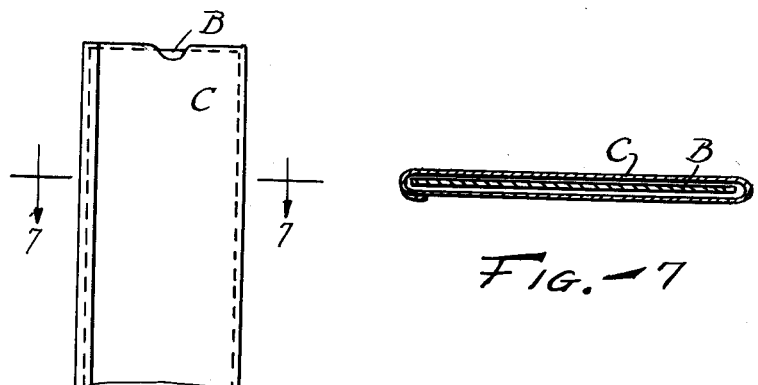
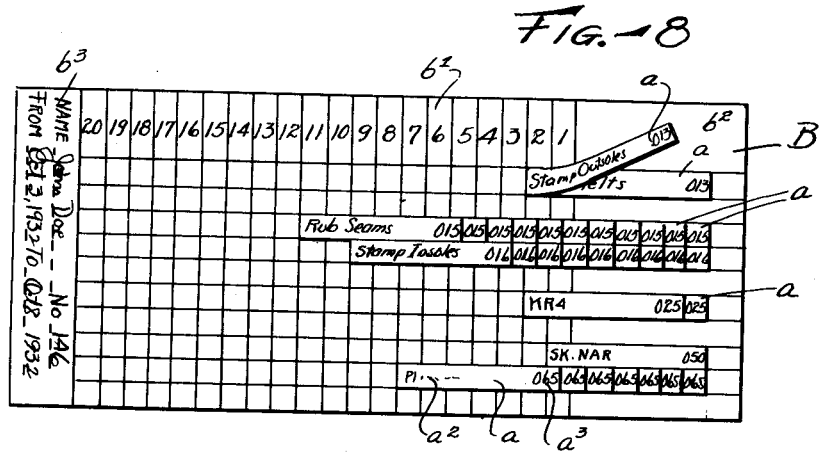
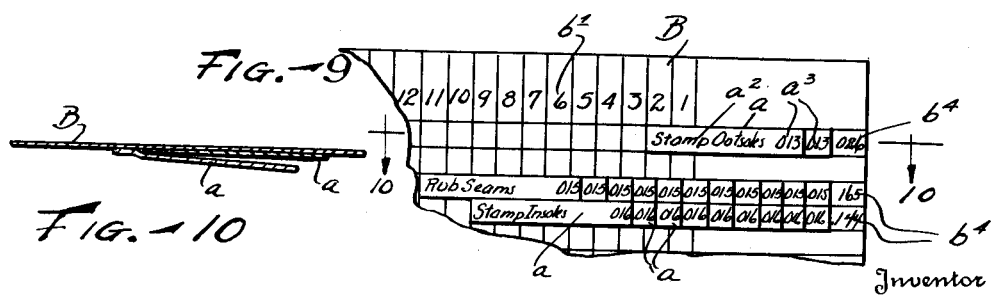

Patented Nov. 6, 1934

1,979,283

UNITED STATES PATENT OFFICE

1,979,283

ACCOUNTING SYSTEM

Henry C. Osborn, Cleveland, Ohio, assignor to Multigraph Company, Wilmington, Del., a corporation of Delaware Application November 18, 1932, Serial No. 643,196

11 Claims. (Cl. 283—66)

In many industries records are kept by means of coupons representing individual items, these coupons being periodically collected and classified. The coupons frequently have a numerical indication and when all of those which are the same in this regard are collected together, the total numerical amount is, of course, the product of the number of coupons times the amount indicated. Frequently the coupons, while of the same numerical characteristic differ in other data, and it is desirable that, though the coupons are collected in numerical groups, it be possible to readily inspect the individual data on the coupons. Not only are such coupons collected and classified, to enable a summary to be made at the time, but it is frequently desirable to preserve the coupons in their classified grouping, as a permanent record, and such record is preferably in a form which will show at once the proper numerical grouping and will still leave the coupons so that the individual characteristics thereof may be readily inspected.

The general object of my invention is to provide means by which the various coupons may be effectively collected and classified into compact but readily visible groups, and may be preserved in such condition as a permanent record.

An illustration of coupon accounting is in the keeping pay-roll records for piece-work. In such instances it is customary for a route sheet to be made out specifying the different operations together with the rate to be paid therefor, in the form of a sheet of detachable coupons. This sheet goes with the work through the factory and each workman detaches a coupon representing the work he has performed. At the end of any given period, the workman turns into the office his various coupons as the basis for his pay-roll credit.

Heretofore, a large amount of work has been involved in arranging, and classifying the various coupons, and crediting them to the proper workman. Moreover, as the coupons are necessarily of small size they are liable to be lost or mislaid. Accordingly, disagreements are likely to result between employer and employees as to the latters' credits.

As applied to the classification of coupons representing piece-work, it is an object of my invention to provide means whereby such coupons may be effectively collected and classified by the workman himself, thus protecting the workman from loss in compensation, due to loss or misapplication of the coupons, as well as very materially reducing the time and labor of subsequent classification.

To the above end, I provide a chart divided into numbered rows, preferably columns, and I furnish coupons adapted to be secured to the chart with the coupons arranged in rows at right angles to the numbered rows, the various coupons in any row overlapping shingle-wise, so that each attached coupon becomes associated with a certain specific numbered row or column. Thus, if the first-mentioned rows or columns are numbered from unity consecutively, the number at the head of the last column in which a coupon is attached indicates the number of coupons in that coupon row.

More specifically, I prefer to form each coupon with dried adhesive on a portion of the back thereof adjacent one end for a region corresponding to the width of a numbered column. On the face of the coupon is printed or written the matter it represents, and also on the face, but near the opposite end from the gummed region, is printed the rate or other numeral on which the computation is to be based.

When such coupons as just described are secured to the chart, in a horizontal row, for instance, the coupons of the same rate being arranged in the same row, and overlapping each other so that each successive coupon is attached in a succeeding vertical column, then the total amount for any particular row of coupons will be the product of the rate on the coupon times the number at the head of the column to which the last coupon is attached.

For instance, if there are ten coupons, each specifying a 15¢ rate, and these coupons are attached, the first to column one, and the second to column two, and so on, the last coupon will be attached to column ten, and the total will be ten times 15¢ or $1.50.

By furnishing the coupons in a sheet from which the workman severs them, and providing each coupon with adhesive, and furnishing the workman with a chart to which he attaches his coupons shingle-wise, as stated, there is no danger of the coupons becoming lost, and the group of coupons is immediately and automatically classified, enabling the workman or other original user, as well as the payroll clerk, to determine very quickly the total amounts due for any particular work over any particular period.

A further part of my system is to furnish the workman with an envelope having a transparent face and adapted to contain the chart with its attached coupons, so that he may protect the coupons against dislodgment, while, at any time, the situation as portrayed by the coupons may be readily observed without removing the chart from the envelope.

My classifying or recording system will be more apparent from the following description in connection with the drawings illustrating one method of utilizing the same for keeping payroll records, though it is to be understood that my invention is not limited to such specific use.

Figure 2:
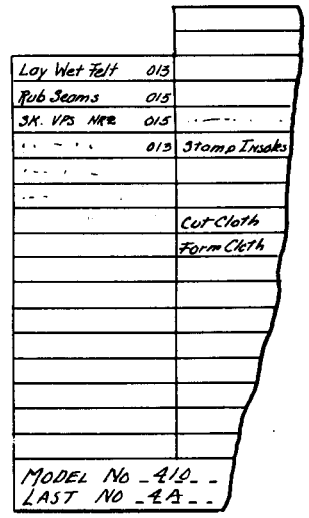
Figure 3:
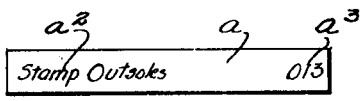
Figure 4:
Figure 5:
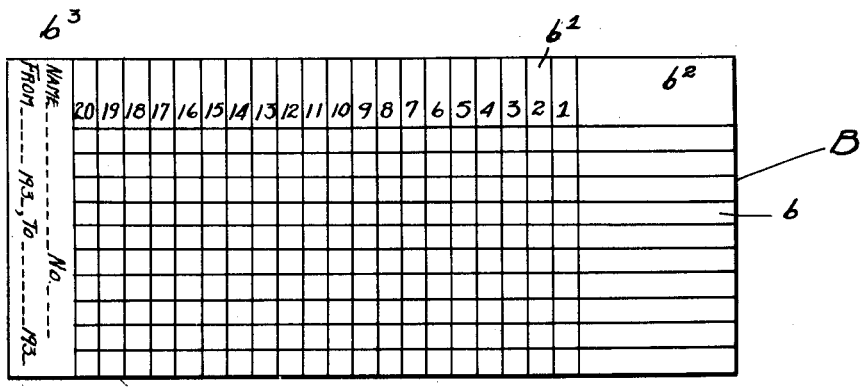

In the drawings, Fig. 1 is a plan of a so-called route sheet, made up of my detachable gummed coupons, each specifying a certain character of work and the rate of compensation therefor, the lower portion of the sheet being curled over to show its rear face; Fig. 2 is a view of such sheet after two of the coupons have been removed; Figs. 3 and 4 are views on a larger scale of any one of the coupons showing its front and rear faces respectively; Fig. 5 is a view of the chart to which the coupons are successively attached in carrying out the system; Fig. 6 illustrates the chart mounted in a protecting envelope, which has a transparent face and may be made entirely of transparent material, as glassine or cellophane; Fig. 7 is a cross-section of Fig. 6, as indicated by the line 7—7 and on a larger scale; Fig. 8 is a face view of the chart with a number of coupons attached thereto; Fig. 9 is a view of a portion of the chart with attached coupons illustrating summaries which may be applied to the margin by the payroll clerk; Fig. 10 is a cross-section through a portion of the chart and plurality of coupons attached thereto, indicated by the line 10—10 on Fig. 9.

In general, "A" indicates the route sheet made up of individual coupons "a"; "B" indicates the chart to which the workman attaches the coupons, and "C" indicates the envelope in which he keeps the chart, with coupons attached, in a readily visible manner.

The route sheet A is preferably composed of a plurality of columns of coupons, three columns being shown. On the back of the sheet are gummed regions located behind one end portion of each coupon, preferably the left-hand end. Thus, in the route sheet shown in Fig. 1, there are three gummed areas shown at $a'$. The coupons may be defined by perforations or scoring or lines, or simply by the spacing of the matter printed on the sheet. Such matter may comprise the name of the work to be done ($a^2$) and the rate ($a^3$), the latter being located adjacent the extreme end of the coupon opposite the gummed end.

In the particular arrangement of route sheet shown in the drawings, when coupons have been removed therefrom as indicated in Fig. 2, each coupon is of the form shown in Figs. 3 and 4, carrying on its face a suitable designation in words or other characters extending along the coupon from the left-hand end as shown at $a^2$, and adjacent the right-hand end, on the face, is the rate in numerals ($a^3$), while on the back of the coupon, adjacent the left-hand edge, is the gummed portion $a'$, which covers an area substantially corresponding in size with the area appropriated to the rate ($a^3$) at the opposite end and on the opposite face.

It follows from the above described character of coupons that when the coupons are attached shingle-wise, the gummed portion of each coupon being beyond the left-hand end of the one below it, the rate indication on each coupon will project to the right of the coupon next surmounting it, so that all the rate indications will be visible.

Figs. 5, 8 and 9 indicate a suitable chart to which the coupons may be attached. This comprises a sheet B divided by lines into horizontal rows $b$, corresponding to the height of the respective coupons, and divided by lines into vertical columns $b'$, the width of which correspond to the gummed area on the coupon. The first column begins a distance from the right-hand end of the sheet at least as great as the length of the coupon. In other words, there is provided a wide column $b^2$ having a width equal to or greater than the length of the coupon. The columns $b$ are successively numbered 1, 2, 3, etc. from right to left. Twenty numbered columns are indicated in the drawings, and ten horizontal rows.

To the left of the last column is a space preferably carrying suitable printing $b^3$ to identify the card with the particular workman or user. Thus there may be indicated spaces for his name and number and for dates, to show the period to which the card relates.

In utilizing the system in connection with pay-roll records for piece-work, it is to be understood that the route sheet is first prepared having the different operations arranged in the order in which they are to be performed, each operation typed or printed together with the rate for that operation constituting a single coupon. This route sheet is delivered to the workman, who performs the first operation, and is intended to pass from workman to workman as they perform the successive operations listed.

The first workman severs the first coupon and by means of the gum $a'$ thereon attaches it to the chart in column 1, thereof and in any desired horizontal row. If this same workman performs the second operation he removes the next coupon, and if it is at the same rate as the first coupon he places it in the same horizontal row attaching it at column 2. If, however, it is of different rate, he attaches it in another horizontal row in column 1.

The operation just described is illustrated near the upper left-hand corner of Figs. 8 and 9, where the coupon detached from the upper left-hand corner of the route sheet (see Figs. 1 and 2) reading "Welts—.013" is attached in the top horizontal row at column 1, while the second coupon reading "Stamp out soles—.013" is attached in the same row at column 2, and thus overlaps shinglewise the first coupon. The third coupon designated "Rub seams—.015" when detached will be affixed to column 1 in some other horizontal row on the chart.

It will be seen from the examination of Fig. 8 that at the end of any given period there will be a number of coupons attached to the chart. Each coupon will be in a certain column and all of the coupons bearing the same rate will be in the same horizontal row—at least until that row is filled, when another row may be started—so that to obtain the total for any particular type of work it is only necessary to multiply the column heading by the rate on the coupon.

It will be seen that in Fig. 8 there are two coupons carrying the rate .013 and the last one is attached in column 2, and accordingly the total is obtained by multiplying .013 by two, giving 0.26. If there are 11 coupons bearing the rate .015, as shown in Fig. 8, the last coupon will appear in colum 11 and the total will be 11 times .015 or .165.

As the coupons in any horizontal row overlap shinglewise, so that the rate portion of each coupon is visible, it is very easy for the checking clerk to see that the coupons of the same rate are all in the same horizontal row. There is preferably sufficient space on the chart at the right-hand end of the first attached coupon to allow the clerk to write in the total, which may be done as indicated at $b^4$, in Fig. 9.

The workman ordinarily keeps the chart B in a transparent envelope C, which is open at one end for the insertion of the chart, and he can thus carry the chart fully protected in his pockets. Whenever he performs the piece-work he simply detaches the coupon from the route sheet, moistens the end and fastens it to the chart in proper location. As the envelope is transparent, the chart with the attached coupons is readily visible and the results of his work apparent to him or to any inspector who wishes to examine the chart.

The chart, with attached coupons, protected by the transparent envelope, forms a permanent record of the work performed by the individual indicated over any selected period of time. Danger of losing the coupons is avoided, the workman is sure to receive proper credit, and the large amount of time heretofore employed by clerks in sorting and counting the different coupons is obviated.

While I have described the accounting system as carried out for piece-work pay-roll records, it is to be understood it has a much wider adaptation than this. It may be used, for instance, for keeping inventories or by purchasing departments of manufacturing concerns. In fact, by suitable adaptation to the particular requirements, the system could be advantageously employed by transportation companies and financial institutions or others keeping track of tickets or coupons carrying different rates. Accordingly, I do not intend to limit myself in this patent further than the appended claims and distinctions over the prior art necessarily require.

I claim:

1. The combination of a chart ruled in two directions at right angles to each other to provide a series of horizontal rows and a series of vertical columns, and a set of coupons, each having adhesive on its rear face adjacent one end and having a designation on its front face adjacent the other end, said coupons being of such width and length that they may be readily attached in the same horizontal row, each to a successive column, and when so attached will have their said indications visible.

2. The combination of a chart cross-ruled to provide horizontal and vertical rows, one of such sets of rows being designated in numerical order and a set of coupons having an attaching area on the back adjacent one end, substantially corresponding to the rectangular area provided by intersection of two rows at right angles to each other, each coupon having a designation on its face at the opposite end located in a region having an area substantially corresponding to the attaching area, whereby said coupons may be placed in a row in one direction successively overlapping and gum adapted when moistened to attach the coupons at different intersecting rows to allow the free ends of the coupons to be visible.

3. The combination of a chart ruled into a set of comparatively narrow vertical columns of the same width with a wide column adjacent the beginning of the set of narrow columns, and a set of coupons for attachment to the chart, said coupons having a length substantially corresponding to the width of the wide column and having on their rear face at one end a gummed area substantially corresponding to the width of one of the narrow columns.

4. The combination of a chart ruled in two directions at right angles to each other to provide a series of horizontal rows and a series of vertical columns, and a set of coupons, each having a designation on its front face adjacent one end, said coupons being of such width and length that they may lie in the same horizontal row overlapping shinglewise with the portion at the opposite end from the designation registering with successive columns, and gum between the registering faces of the applied coupons and chart adapted to effect their adherence.

5. In combination, a chart having rectangular regions of the same size defined by rows of intersecting lines, comparatively long rectangular coupons having designations adjacent one end, means for attaching the other end of the coupons to the rectangular regions of the chart, and the said rectangular regions being at least as large as the area covered by the designations on the end portions of the coupons.

6. The combination of a chart divided into intersecting vertical columns and horizontal rows, the columns being successively numbered from one up leading from right to left, coupons of such size that an end portion thereof may be secured within the space common to an intersecting vertical column and horizontal row, having designations on their face with numerals adjacent the right hand end, whereby when the coupons in the horizontal row are attached to successive columns the designations of the right-hand end of the different coupons will be visible.

7. The combination of a chart divided into vertical columns each of the same width and horizontal rows each of the same height, the columns being successively numbered from one up in the direction from right to left, a set of coupons of a height corresponding to that of the rows bearing on their faces designations with numerals located adjacent the right-hand end of the coupon, whereby when coupons having the same designation are placed in the same row and attached at their left-hand ends to successive columns beginning at column one, the total of the rates will be the product of such rate times the designation of the last column in which a coupon is attached.

8. The combination of a sheet readily separable into small coupons, said coupons having designations at one end thereof, a chart divided by intersecting lines into numbered regions each of an area corresponding to the height and a portion of the length of a coupon, and means for attaching the other end of the coupons to the numbered regions of the chart, whereby the coupons may overlap while the end portions of successive coupons are visible.

9. The combination of a chart ruled into a set of comparatively narrow columns of the same width with a wide column adjacent the beginning of the set of narrow columns, said sheet being also ruled transversely into narrow rows of the same height, and a set of coupons for attachment to the chart, said coupons having a height substantially corresponding to the height of a row and having a length substantially corresponding to the width of the wide column, and means for attaching the rear faces of the coupons at one end to successive narrow columns of the chart.

10. A system of accounting comprising a chart divided into regions having numeral designations and a series of coupons having indications adjacent one end, there being means including a row of spaces defined by intersecting lines on the chart for locating and attaching the coupons to the chart shinglewise, and each of said spaces corresponding to the width and a portion of the length of a coupon, whereby the coupons may be secured compactly to the chart with the said indications on the various coupons simultaneously visible.

11. The combination of a sheet carrying designations with numerals, such matter being arranged in a column on the sheet so that the sheet may be readily separated into coupons each having a designation with a numeral adjacent one end of the coupon, and a chart having successively numbered columns divided by transverse lines to define attaching areas, each attaching area of the chart corresponding to the width and a portion of the length of a coupon and there being means for attaching each coupon at the end opposite the numeral, whereby when such end portions of said coupons are attached each to a successive column of the chart each succeeding coupon may expose a portion of a preceding coupon.

HENRY C. OSBORN.